(12) United States Patent
Iwade et al.

(10) Patent No.: US 11,390,018 B2
(45) Date of Patent: Jul. 19, 2022

(54) THREE-DIMENSIONAL MODELING METHOD

(71) Applicant: TORAY ENGINEERING CO., LTD., Tokyo (JP)

(72) Inventors: Takashi Iwade, Otsu (JP); Jun Inagaki, Otsu (JP)

(73) Assignee: TORAY ENGINEERING CO., LTD., Tokyo (JP)

(*) Notice: Subject to any disclaimer, the term of this patent is extended or adjusted under 35 U.S.C. 154(b) by 48 days.

(21) Appl. No.: 16/967,579

(22) PCT Filed: Jan. 24, 2019

(86) PCT No.: PCT/JP2019/002254
§ 371 (c)(1),
(2) Date: Aug. 5, 2020

(87) PCT Pub. No.: WO2019/155897
PCT Pub. Date: Aug. 15, 2019

(65) Prior Publication Data
US 2021/0268722 A1 Sep. 2, 2021

(30) Foreign Application Priority Data

Feb. 9, 2018 (JP) .............................. JP2018-021502

(51) Int. Cl.
*B29C 64/129* (2017.01)
*B33Y 10/00* (2015.01)
(Continued)

(52) U.S. Cl.
CPC .......... *B29C 64/129* (2017.08); *B29C 64/209* (2017.08); *B29C 64/268* (2017.08);
(Continued)

(58) Field of Classification Search
CPC ... B29C 64/129; B29C 64/209; B29C 64/268; B33Y 10/00; B33Y 30/00; B29K 2309/08; B29K 2907/04
See application file for complete search history.

(56) References Cited

U.S. PATENT DOCUMENTS

2005/0087897 A1 4/2005 Nielsen et al.
2017/0106594 A1* 4/2017 Gardiner ............... B29C 64/135
(Continued)

FOREIGN PATENT DOCUMENTS

JP 2000-190086 A 7/2000
JP 2005-125787 A 5/2005
(Continued)

OTHER PUBLICATIONS

International Search Report of the corresponding International Application No. PCT/JP2019/002254, dated Mar. 12, 2019.
(Continued)

*Primary Examiner* — Leith S Shafi
*Assistant Examiner* — Xinwen Ye
(74) *Attorney, Agent, or Firm* — Global IP Counselors, LLP

(57) ABSTRACT

A three-dimensional modeling method comprises modeling a shell layer of a three-dimensional modeling object using a shell material, and modeling a core portion inside of the modeled shell layer using a core material. The modeling of the shell layer is performed by an additive manufacturing technology, and is divided into multiple steps in a lamination modeling direction of the three-dimensional modeling object. The modeling of the core portion includes filling the core material inside of the modeled shell layer subsequent to each modeling of the shell layer that has been divided into the multiple steps, and correctively curing the core material by irradiation with an active energy ray or by application of heat energy after the multiple steps of the modeling of the shell layer and the filing of the core material are all completed.

14 Claims, 17 Drawing Sheets

(51) Int. Cl.
*B29C 64/209* (2017.01)
*B29C 64/268* (2017.01)
*B33Y 30/00* (2015.01)
*B29K 309/08* (2006.01)

(52) U.S. Cl.
CPC .......... *B33Y 10/00* (2014.12); *B29K 2309/08* (2013.01); *B29K 2907/04* (2013.01); *B33Y 30/00* (2014.12)

(56) References Cited

U.S. PATENT DOCUMENTS

2017/0151712 A1* 6/2017 La Forest ............. B29C 64/393
2018/0001550 A1 1/2018 Zhao et al.
2018/0243984 A1 8/2018 Hayashida et al.

FOREIGN PATENT DOCUMENTS

| JP | 2006-78604 A | 3/2006 | | |
|---|---|---|---|---|
| JP | 2018-502751 A | 2/2018 | | |
| WO | 2017/038985 A1 | 3/2017 | | |
| WO | WO-2017038985 A1 * | 3/2017 | ............. | B33Y 50/02 |
| WO | WO-2017150196 A1 * | 9/2017 | ............. | B29C 67/00 |
| WO | 2018/097157 A1 | 5/2018 | | |

OTHER PUBLICATIONS

2013 Patent Application Technology Trend Survey Report (Summary), 3D Printer, Mar. 2014, Japan Patent Office.

* cited by examiner

*Prior Art*

*Prior Art*

THREE-DIMENSIONAL MODELING METHOD

CROSS-REFERENCE TO RELATED APPLICATIONS

This application is a U.S. National stage of International Application No. PCT/JP2019/002254 filed on Jan. 24, 2019. This application claims priority to Japanese Patent Application No. 2018-021502 filed on Feb. 9, 2018 with Japan Patent Office. The entire disclosure of Japanese Patent Application No. 2018-021502 is hereby incorporated herein by reference.

BACKGROUND

Field of the Invention

The present invention relates to a three-dimensional modeling method and apparatus, such as a so-called 3D printer whose performance has been remarkably improved in recent years, or a modeling apparatus using an optical fabrication technology that has been put into practical use before that, and particularly relates to a three-dimensional modeling technology of a composite material containing a reinforcing material.

Background Information

The so-called 3D printer employs a three-dimensional modeling method that calculates the cross-sectional shape of a modeling object by a computer based on three-dimensional CAD data, divides the modeling object into thin sliced cross-sectional elements, forms the cross-sectional elements by various methods, and obtains the desired shape by laminating them. Generally, the name of 3D printer is widely used, but internationally, it is often referred to as an Additive Manufacturing Technology. In this specification, the term "3D printer" is mainly used, but expressions will be appropriately used according to the intended use.

The additive manufacturing technology is roughly classified into seven methods as shown below (See 2013 Patent Application Technology Trend Survey Report (Summary), 3D Printer, March 2014, Japan Patent Office, for example), depending on the type of modeling material and the laminating method thereof:

(1) Vat photopolymerization method (Vat Photopolymerization);
(2) Material extrusion method (Material extrusion);
(3) Powder bed fusion method (Powder bed fusion);
(4) Binder jetting method (Binder Jetting);
(5) Sheet lamination method (Sheet lamination);
(6) Material jetting method (Material Jetting); and
(7) Directed energy deposition method (Directed Energy Deposition).

(1) Vat photopolymerization method, as shown in FIGS. 22A to 22E and 27A to 27C, was put into practical use at the earliest time among these, and before the name of the 3D printer has been generalized, it has been used for rapid prototyping under the name such as stereolithography. In most cases, an ultraviolet curable (polymerization) resin is used, the ultraviolet curable resin 41 is held in a tank 3 as shown in FIGS. 22A to 22E, and the liquid surface thereof is selectively irradiated with ultraviolet rays 7 to form a cured area 42 of the first layer (FIGS. 22A to 22C). The cured area 42 of the first layer is supported by a suitable support member 4. Next, the cured area 42 of the first layer together with the support member 4 is submerged in the liquid (FIG. 22D), or by raising the liquid level, the cured area 42 of the first layer is submerged in the liquid by a constant depth. Next, the liquid surface is selectively irradiated with the ultraviolet rays 7 again so that a cured area 43 of the second layer is formed continuously with the cured area 42 of the first layer in the lamination direction above the cured area 42 of the first layer (FIG. 22E. By repeating this, a three-dimensional modeling object is obtained.

In recent years, as a 3D printer commercially available as a personal use, those of (2) Material extrusion method and (6) Material injection method are generally available.

(2) Material extrusion method is a modeling method in which, in many cases, a modeling material made of a thermoplastic resin is heated to be in a molten and fluid state, and the modeling material is laminated while being extruded from a nozzle (see FIGS. 23 and 26A to 26C).

(6) Material injection method is a method in which the viscosity of the modeling material is often slightly lower than that of the (2) Material extrusion method, and, so to speak, the modeling is performed by ejecting and laminating the modeling material instead of the ink from an ink jet printer.

(3) Powder bed fusion method and (4) Binder jetting method are characterized in that powdery or granular modeling materials are used.

With (3) Powder bed fusion method, as shown in FIGS. 24A and 24B, the modeling material powder 61 is placed still in an appropriate tank 60. This is often referred to as a material bed 62. As a modeling material, it is a feature that a wide variety of modeling materials, such as inorganic materials, metals, resins and ceramics, can be selected as long as they can be melted by energy rays. In many cases, the surface of the material bed 62 is selectively irradiated with a laser beam 66 to melt and coalesce the modeling material powder 61 to form a modeling layer 67 of the first layer. In FIGS. 24A and 24B, an infrared laser 63 is used as an energy ray source, and the surface of the material bed 62 can be arbitrarily scanned by using Galvano optics 64 and 65. Next, as shown in FIG. 24B, after a certain amount of the modeling material powder 61 is added, a table 69 is lowered by a certain amount and a squeegee 68 is moved in a direction of arrow A in the figure, so that the portion of the modeling material is leveled and flattened. This again forms the material bed 62. Then, the laser beam 66 is scanned to form the modeling layer of the second layer. By repeating this, a desired three-dimensional modeling object is obtained.

(4) Binder jetting method also uses the material bed composed of the modeling material powder as in the case of (3) Powder bed fusion method, but it is a modeling method in which the modeling material powders are bonded to each other by selectively ejecting a binder material having a function of an adhesive that binds the modeling material powder to the material bed from an inkjet head or the like.

(5) Sheet lamination method, as the name implies, is a method in which sheet-shaped materials, such as paper, plastic film or the like, are cut into laminated cross-sectional shapes, which are sequentially laminated and adhered to perform three-dimensional modeling.

Lastly, (7) Directed energy deposition method has a typical configuration shown in FIG. 25, and is a method of laminating the modeling material while supplying the modeling material and selectively applying energy at the same time. Laser light 71 is transmitted through an inner nozzle 73 of a double tube nozzle 72, and the laser light 71 is condensed on the surface of a base 75 by a condenser lens

74. From an outer nozzle 76, shielding gas and modeling material powder 78 (indicated by arrows in the figure) are sprayed toward the converging point of the laser light 71. At the condensing point of the laser light 71, the sprayed modeling material powder 78 is heated and melted by the laser light 71, and a molten pool 77 in which the modeling material powder 78 is melted and aggregated is formed on the surface of the base 75. This is a method in which the molding material is placed and laminated on the base while the relative position between the base 75 and the double tube nozzle 72 is moved and the molten pool 77 is swimming over the base material. This method is a typical example of a 3D printer using a metal material. From a different point of view, it can be said that this method has been developed as a modeling method by making the arc welding method known from old times finer and more automated.

SUMMARY

The inventors of the present application have previously filed a patent application for an invention related to a three-dimensional modeling method suitable for three-dimensional modeling of a composite material in Japanese Patent Application No. 2016-229964 (hereinafter referred to as "prior application"). In the specification of the prior application, a three-dimensional modeling method is disclosed in which only the outer shell layer (skin layer) of the three-dimensional modeling object is first formed by the skin material, and then the inside (core portion) of the modeled outer shell layer is modeled by the core material. In the specification of the present application, the terms "shell layer" and "shell material" are used in place of the terms "skin layer" and "skin material" in the specification of the prior application, but they are substantially the same except for the expressions.

In the practice of the invention disclosed in the prior application, in the case in which the modeling object, that is, the core portion may be considerably large, or in the case in which the core portion may have a complicated shape having a narrow part, a bent part, a retention part, or the like, there is a problem that filling of the material becomes difficult when the core portion is modeled, that is, the fluid core material is filled into the inside (core portion) of the shell layer after the modeling of the shell layer (same as the skin layer) is completed.

This means that when the modeling object, that is, the volume of the core portion, is considerably larger than the supply amount of the core material per unit time, a large amount of the core material is required and the flow path thereof is also considerably long. Therefore, a considerable amount of time is required to fill the core material, and further, when the viscosity of the core material is high, a considerable amount of time is required to flow the core material to the end of the core portion. In a remarkable case, the core material could not reach the end of the core portion, then there was a problem that voids are generated at the end of the core portion.

In addition, when the core portion has a complicated shape with a narrow part, a bent part, etc., there was a problem that when the core material passes through the narrow part, the bent part, the hydrodynamic flow resistance increases, a considerable amount of time is required for filling. In some cases, there might be a problem where the core material cannot be filled in after the narrow part and the bent part, and voids are generated.

In such a case, as illustrated in FIG. 21, in order to flow the core material to the end of the core portion, a pipe-shaped or tube-shaped injection member is inserted up to near the end of the core portion to inject the core material. There is also a problem that if the modeling object, that is, the core portion becomes considerably large, a considerably long injection member is required, or if the core portion has a complicated shape having a narrow portion, a bent portion, etc., a long and flexible nozzle member that can reach the distal end part and the back end part along the core shape is required. Furthermore, even if such a long and flexible nozzle member can be realized, there is also a problem that it is difficult to make a distal end thereof reach to the distal end part and the back end part along the complicated core shape.

In order to solve the above problems, in the present invention, a three-dimensional modeling method is provided in which an outer shell layer (shell layer) of a three-dimensional modeling object is first modeled using a shell material, and then an inside (core portion) of the modeled outer shell layer is modeled using a core material, wherein the shell layer is modeled by an additive manufacturing technology, and is modeled by dividing the modeling of the shell layer into multiple steps in a lamination modeling direction, the core material is curable from a fluid state to a non-fluid state by irradiation with an active energy ray or by application of heat energy, the core material is filled into the inside (the core portion) of the modeled shell layer for each modeling of the shell layer that has been divided into the multiple steps, the core material is correctively cured by the irradiation with the active energy ray or by the application of the heat energy after the multiple steps of the modeling of the shell layer and the filing of the core material into the core portion are all completed.

According to another aspect of the present invention, there is provided a three dimensional modeling method, wherein the shell layer is modeled by a vat polymerization, the shell material is curable from a fluid state to a non-fluid state by the irradiation with the active energy ray, and the shell material slightly remaining in the core portion is also cured by further irradiating with active energy at the same time as or before and after the core material is collectively cured.

According to a preferred aspect of the present invention, when the core material is filled in the modeled core portion where only uncured shell material remains, the uncured shell material and the core material are replaced by injecting the core material into the uncured shell material.

According to a further preferred aspect of the present invention, when the core material is further filled (refilled) in the modeled core portion where uncured shell material and the filled core material coexist, the refilled core material is injected into the injected core material.

According to a further preferred aspect of the present invention, the shell material and/or the core material contains a reinforcing material.

According to a further preferred aspect of the present invention, the reinforcing material is a fibrous reinforcing material made of carbon fiber, glass fiber, aramid fiber, or a combination thereof.

According to another preferred aspect of the present invention, the lamination modeling direction is in the gravitational direction, and the specific gravity of the uncured core material is larger than the specific gravity of the uncured shell material.

The gist of the invention of the present application is to substantially simplify the shape of the core portion by stepwise performing the modeling of the shell layer after dividing the modeling of the shell layer into multiple steps and by filling the core material in each step, and to avoid the difficulty of filling the core material due to the length and size and the complexity of the core portion. Then, after the modeling of the shell layer and the filling of the core material to the final shape are completed, the curing of the core material may be collectively completed by irradiation with active energy rays and application of thermal energy.

If the modeling of the shell layer is performed by an additive manufacturing technology, which is basically based on layered modeling, it is easy and preferable to divide the modeling into multiple steps and perform the modeling stepwisely.

Further, if the vat polymerization is used as the additional manufacturing technology, it is possible to perform the replacement of the core material with the shell material in liquid. In particular, the remaining shell material in the core portion can be replaced with the core material while the core material is being injected into the remaining shell material using the injection nozzle member or the like. With this configuration, the occurrence of a small space called a void or the like can be reduced relative to when the core material is injected into a space of the core portion created by removing the uncured shell material from the core portion.

Furthermore, it is preferable that a slightly uncured shell material remains in the core portion near the interface of the core and the shell, for example, when replacing the shell material by injecting the core material into the remaining shell material of the core portion with an injection nozzle member or the like, it is possible to cure the remaining shell material by irradiating the entire modeling object with the active energy ray when the core material is cured, or before or after thereof, and to avoid the occurrence of the void or the residual of the uncured shell material.

According to the invention of the present application, it becomes easier to fill the core material even when the modeling object becomes considerably large, and the core portion thereof has a narrow part, a bent part, a retention part, and the like, and it is possible to avoid the problem of the separation of the dispersed state of the reinforcing material because the modeling interface is not formed in the core material even if the composite material is used as the core material.

DETAILED DESCRIPTION OF EMBODIMENTS

First, the most basic embodiment of a three-dimensional modeling method according to the present invention will be conceptually described with reference to FIGS. 1 to 7. It should be noted that, in these drawings, the dimensions of the three-dimensional modeling object itself and a shell layer and a core portion thereof are exaggerated for easy understanding of the gist of the present invention.

A three-dimensional modeling object 1 has a core portion 1b in a shell layer 1a, and a core material 2 is filled in the core portion 1b and solidified to form the final three-dimensional modeling object 1.

Figure 1:
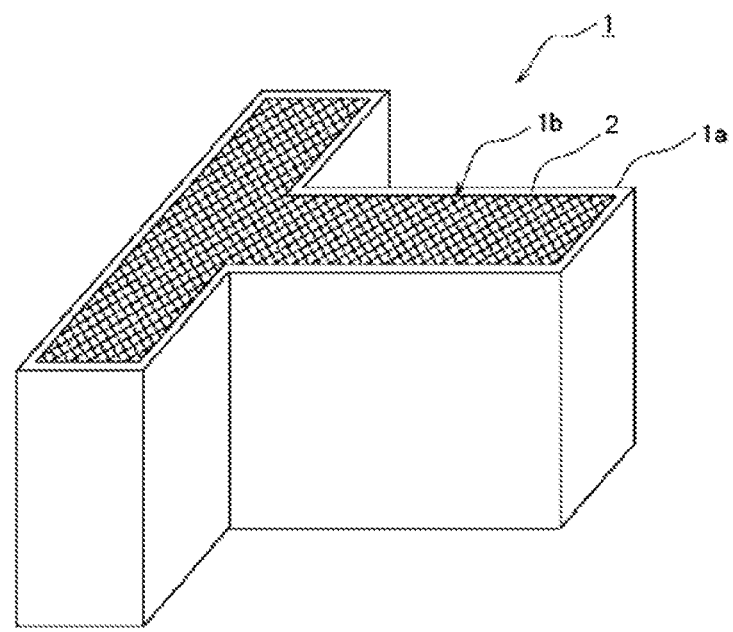
FIG. 1 is a figure showing a modeling object by a three-dimensional modeling method in accordance with the present invention.
Figure 2:
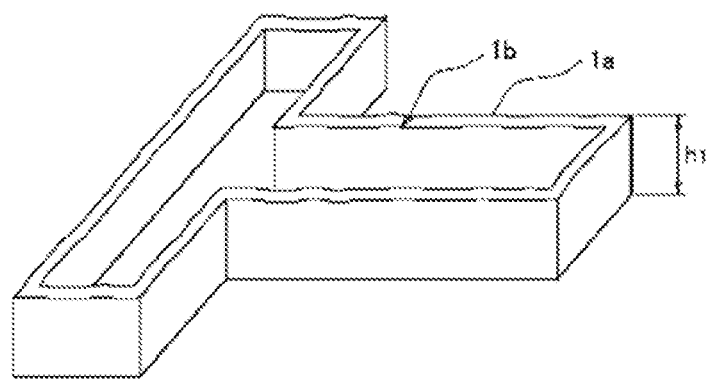
FIG. 2 is a figure showing a state during modeling of the modeling object by the three-dimensional modeling method in accordance with the present invention.

First, as shown in FIG. 2, the shell layer 1a is modeled at an appropriate height h1. A modeling method and apparatus according to an additive manufacturing method can be used for modeling the shell layer 1a, and the height direction is preferably the lamination modeling direction in the additive manufacturing method.

Figure 3:
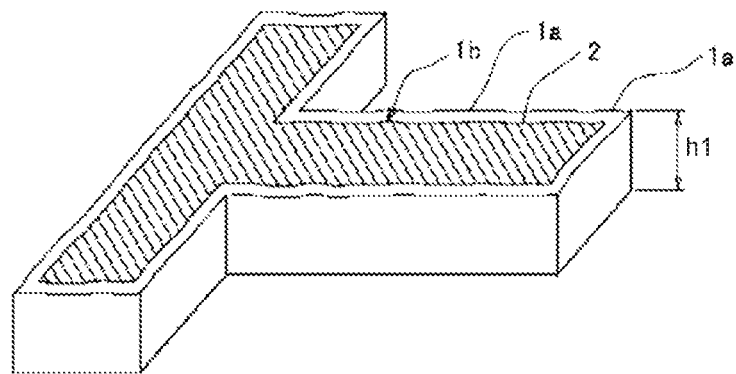
FIG. 3 is a figure showing a state during modeling of the modeling object by the three-dimensional modeling method in accordance with the present invention.
Figure 4:
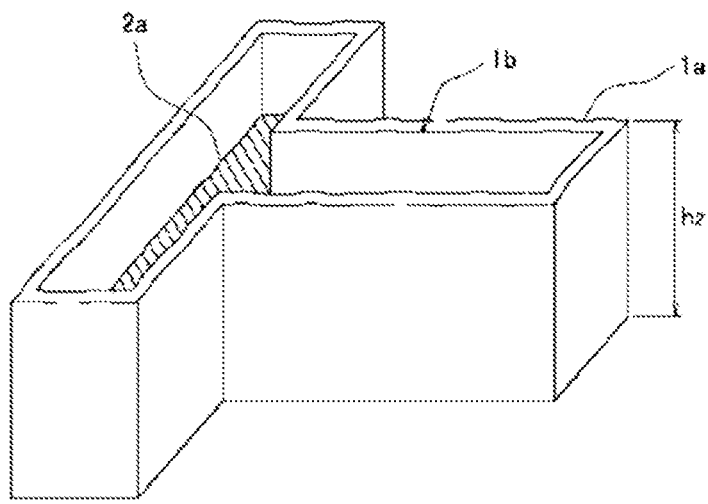
FIG. 4 is a figure showing a state during modeling of the modeling object by the three-dimensional modeling method in accordance with the present invention.

The core material 2 is filled when the shell layer is modeled by h1 (FIG. 3). The core material 2 is filled but not solidified, and subsequently the shell layer 1a is further modeled to a height of h2 as shown in FIG. 4. In this state, the core material 2 is further filled to obtain the state shown in FIG. 5.

Figure 5:
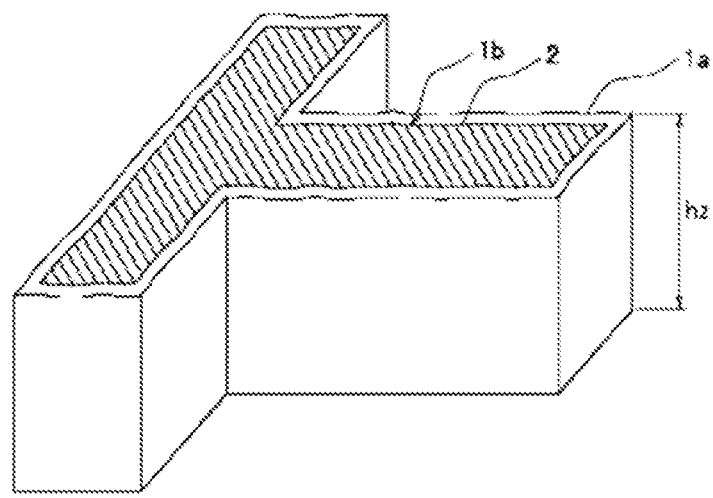
FIG. 5 is a figure showing a state during modeling of the modeling object by the three-dimensional modeling method in accordance with the present invention.
Figure 6:
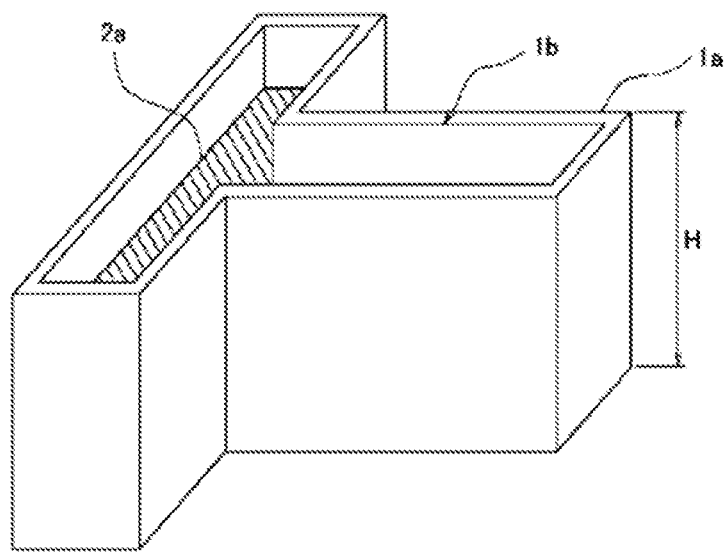
FIG. 6 is a figure showing a state during modeling of the modeling object by the three-dimensional modeling method in accordance with the present invention.

It should be noted here that one of the effects of the present invention is that when the core material 2 is additionally filled on the core material 2a that had already filled up to the height h1 shown in FIG. 4, which results in a state of FIG. 5, both the core material 2 and the filled core material 2a are in an uncured and liquid state having fluidity, and that even if the core material 2 is additionally filled on the core material 2a, both can be easily mixed with each other, and no interface (modeling interface) between the core material 2 and the filled core material 2a is formed at the height h1. Further, in the state of FIG. 5, it is possible to further promote the mixing of the two by stirring the core material 2 with an appropriate stirring member or the like (not shown).

This makes it possible that when the core material is a composite material containing a reinforcing material, the problem of the separation of the reinforcing material or the dispersed state of the reinforcing material at the modeling interface, which is mentioned as a problem to be solved in the prior application, is avoided, and thus is preferable.

Figure 7:
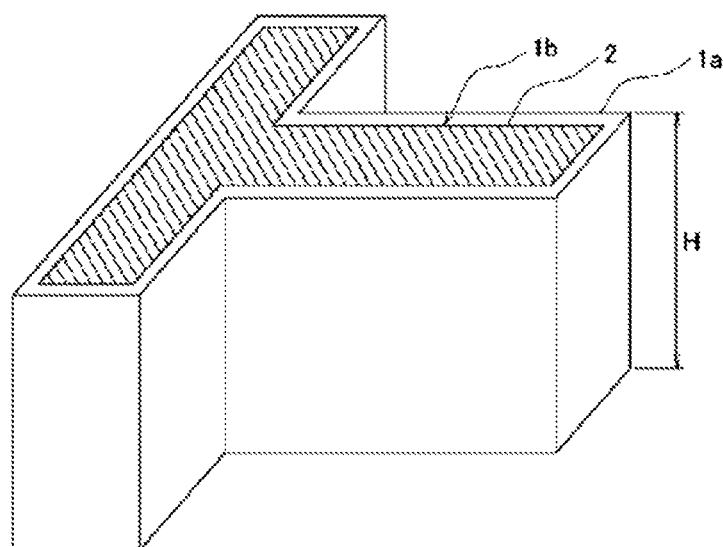
FIG. 7 is a figure showing a state during modeling of the modeling object by the three-dimensional modeling method in accordance with the present invention.

After the shell layer 1a is further modeled in the height direction to be modeled to the height H of the final modeling object (FIG. 6), the core material 2 is filled to the height H again (FIG. 7). Here, the modeling of the shell layer 1a and the filling of the core material 2 into the core portion 1b are completed. After that, the entire three-dimensional modeling object 1 is placed in, for example, an appropriate heating furnace to apply thermal energy to the core material, or the entire area is irradiated with an active energy ray, which cures the core material 2 and completes the modeling of the three-dimensional modeling object 1 shown in FIG. 1.

In the present embodiment, the modeling of the shell layer 1a of the three-dimensional modeling object 1 is performed by dividing the modeling into three steps in the lamination modeling direction. Of course, this number of steps may be arbitrary. When the shape of the core portion 1b is relatively simple and the core material 2 can be easily filled in, or when the size of the three-dimensional modeling object 1, that is, the internal volume of the core portion 1b is smaller relative to the hourly supply capacity of the core material 2, the number of divisions of the shell layer 1a can be small. In an extreme case, it may be possible to model the shell layer 1a at once and then fill the core material 2 therein.

Next, as a second embodiment of the present invention, a schematic configuration diagram and a modeling procedure of a composite material 3D printer 100 will be described with reference to FIGS. 8 to 20, that uses a modeling apparatus by a vat polymerization, which is one of additive manufacturing methods, to form a shell layer, and uses a reinforced resin in which a reinforcing material is dispersed in a thermosetting resin, as a core material.

Figure 8:
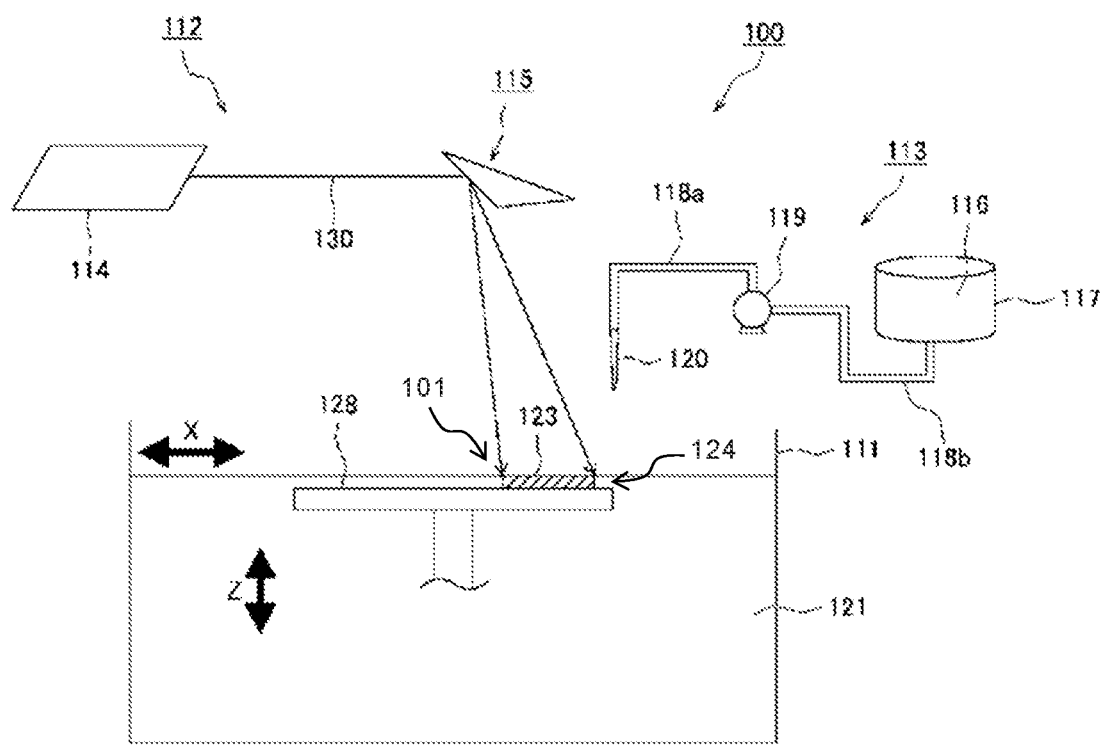
FIG. 8 is a figure showing a composite material 3D printer in accordance with another embodiment of the present invention.

In FIG. 8 and subsequent drawings, the arrow x direction in the drawing is the x axis direction, the arrow z direction is the z axis direction, and the y axis direction is perpendicular to the paper surface.

The composite material 3D printer 100 mainly includes a modeling tank 111 in which an ultraviolet curable resin 121, which is a shell material, is stored, a laser optical system 112, and a core material supply system 113.

An ultraviolet curable resin 121 is stored in the modeling tank 111, and its liquid surface position can be maintained and adjusted at a predetermined position by an ultraviolet curable resin supply system (not shown). As the ultraviolet curable resin 121, known ones such as epoxy type and acrylic type can be used. A modeling table 128 is provided in the modeling tank 111. The modeling table 128 is provided for supporting a three-dimensional modeling object 101, and can be moved and installed at an arbitrary position in the z axis direction in the drawing by a driving mechanism (not shown).

The laser optical system 112 includes an ultraviolet laser 114 and a scanning optical system 115, and the ultraviolet laser light 130 emitted from the ultraviolet laser 114 can scan in a predetermined range on the liquid surface (that is, the xy plane) of the ultraviolet curable resin 121 by the scanning optical system 115. The ultraviolet curable resin 121 is cured by irradiation of the ultraviolet laser light 130 to a predetermined depth from the liquid surface as indicated by 124 in the drawing. This curing depth is generally about 0.1 mm to 0.2 mm. Of course, it is possible to adjust the curing depth by adjusting the output of the ultraviolet laser 114. If the upper surface of the modeling table 128 is located at a depth that is about the curing depth from the liquid surface of the ultraviolet curable resin 121, the three-dimensional modeling object 101 is modeled on the modeling table 128.

The core material supply system 113 pumps and supplies the core material 116 from the core material tank 117 which stores the core material 116 therein by the pump 119 through the piping systems 118b and 118a in order and discharges it from the tip of the nozzle 120. The nozzle 120 can be moved and fixed in each xyz direction in the drawing by a moving mechanism (not shown). Therefore, the piping system 118a has a flexible structure and material so as to follow the movement of the nozzle 120. The core material 116 is a thermosetting resin in which a reinforcing material is uniformly dispersed, and like the shell material 121, a known thermosetting resin such as an epoxy type or an acrylic type can be used.

Hereinafter, a modeling procedure by the composite material 3D printer 100 will be sequentially described. Although in the present embodiment, an example in which the modeling of the shell layer 125 is divided into two steps and is modeled as illustrated, depending on the size of the three-dimensional modeling object 101 and the shape of the core portion 126, there is a case where the modeling may be performed once, and conversely, there is a case where two or more divisions are required. However, irrelevant to the number of divisions of the modeling of the shell layer, the same procedure is only repeated and there is no essential difference in the molding method.

Figure 9:
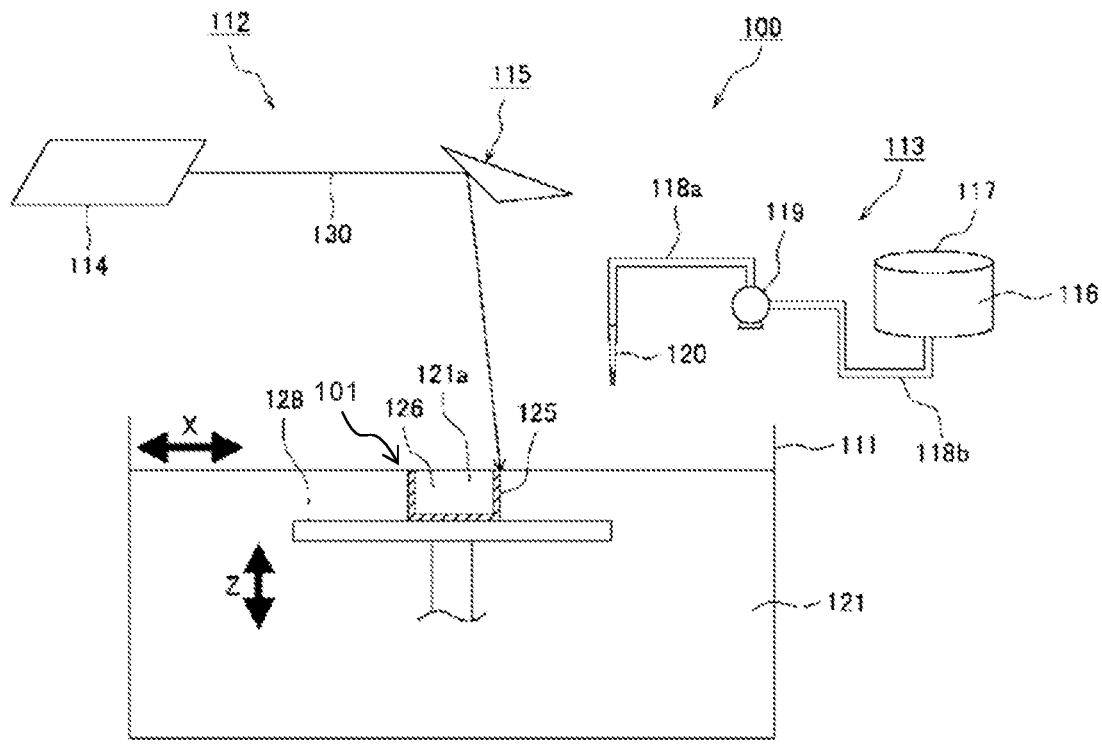
FIG. 9 is a figure showing a state during modeling by the composite material 3D printer in accordance with the present invention.

First, the first modeling is performed. The shell layer 125 is modeled on the modeling table 128 while scanning the ultraviolet laser light 130 and sequentially lowering the modeling table 128 by a predetermined height (depth) in the z direction. This state is shown in FIG. 9. The uncured ultraviolet curable resin and the uncured shell material 121a remain inside the modeled shell layer 125 (in the core portion 126).

Figure 10:
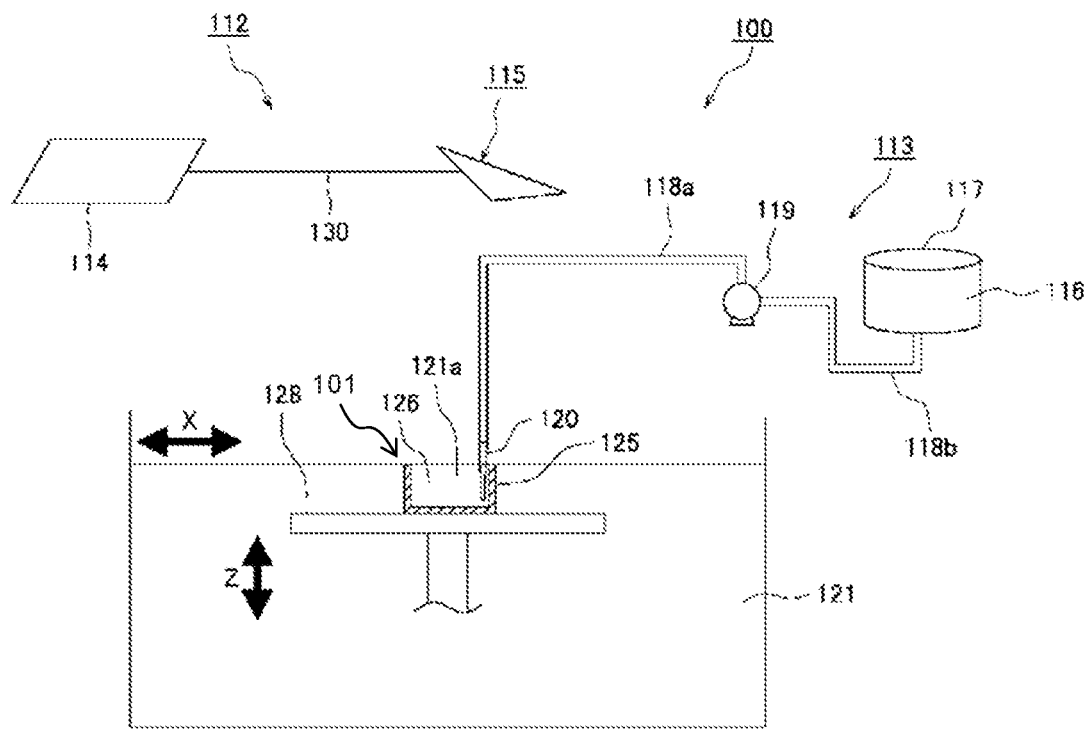
FIG. 10 is a figure showing a state during modeling by the composite material 3D printer in accordance with the present invention.
Figure 11:
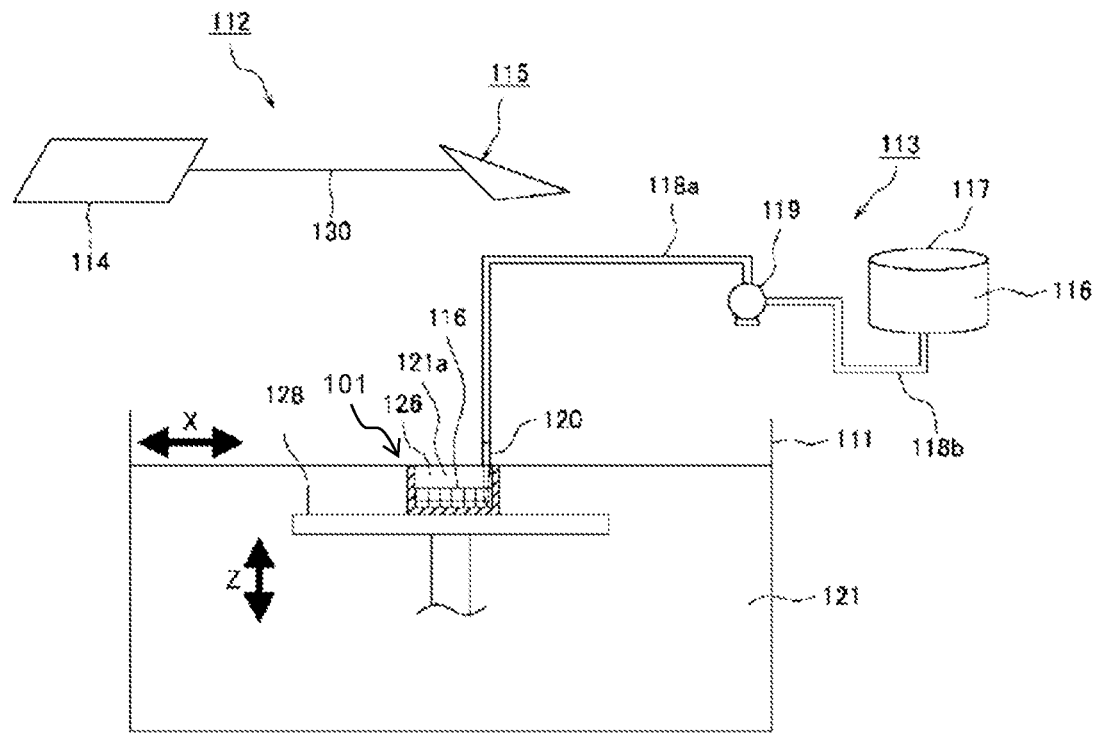
FIG. 11 is a figure showing a state during modeling by the composite material 3D printer in accordance with the present invention.

Next, the nozzle driving mechanism is operated to insert the nozzle 120 into the core portion 126, and the tip thereof is arranged near the bottom of the core portion 126 (FIG. 10). In this state, the pump 119 is driven to slowly discharge the core material 116 from the tip of the nozzle 120 and to supply the core material 116 to the core portion 126. As the core material 116 is discharged and supplied from near the bottom of the core portion 126, the remaining uncured shell material 121a overflows from the edges of the modeled shell layer 125, and the uncured shell material 121a in the core portion 126 is gradually replaced with the core material 116 from the bottom (FIG. 11). At this time, if the specific gravity of the core material 116 is larger than that of the shell material 121, the core material 116 tends to settle into the uncured shell material 121a by its own weight, and thus it is preferable because the replacement from the bottom of the core portion 116 can be realized more easily. In general, the material used as the reinforcing material is often one having a relatively high specific gravity such as carbon fiber, glass fiber, and inorganic material powder (so-called compound) such as silica, and therefore, in many cases, the specific gravity of the core material 116 becomes larger than that of the shell material 121.

Figure 12:
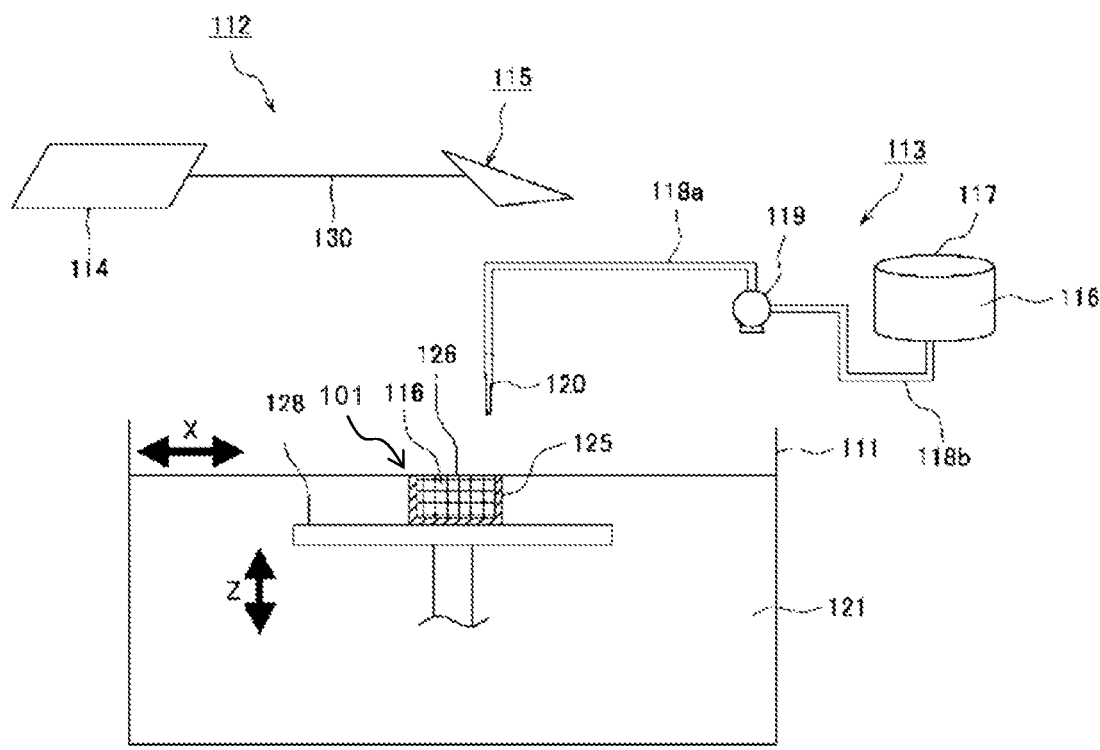
FIG. 12 is a figure showing a state during modeling by the composite material 3D printer in accordance with the present invention.

FIG. 12 shows a state where the replacement of the uncured shell material 121a and the core material 116 is completed.

Figure 13:
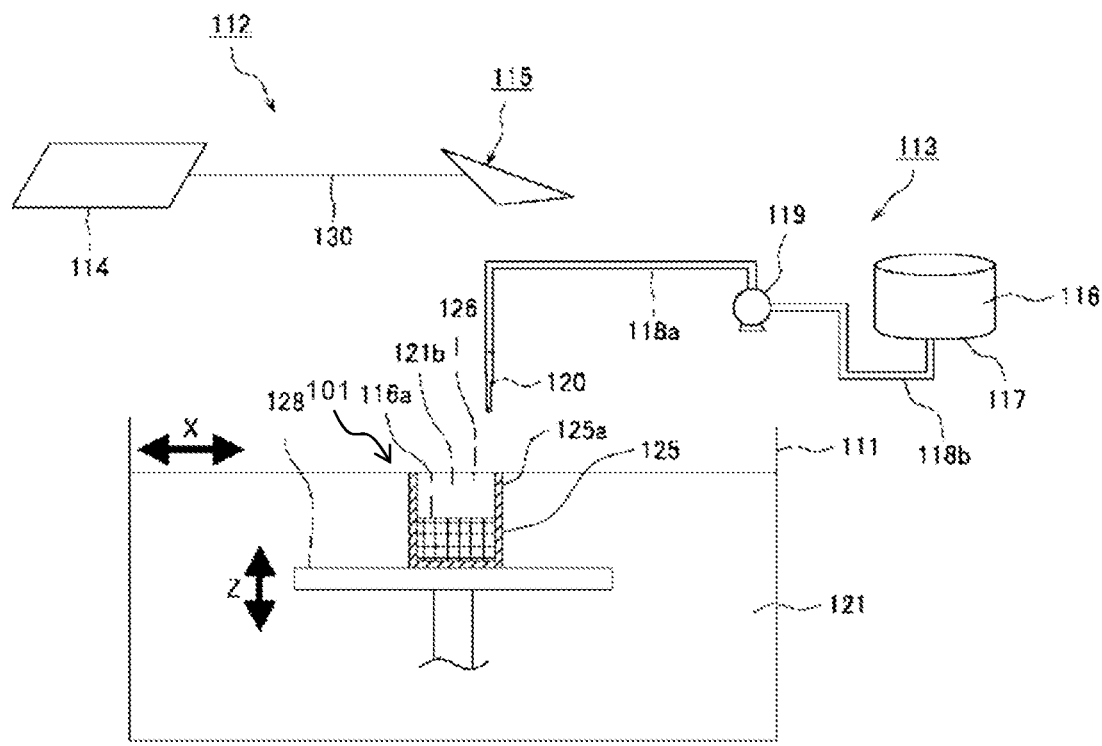
FIG. 13 is a figure showing a state during modeling by the composite material 3D printer in accordance with the present invention.

Then, the second modeling is started. First, the shell layer 125a is formed for the second time, and the state shown in FIG. 13 is obtained. At this time, inside the shell layers 125 and 125a, the core material 116a which has been injected in the first modeling is present at the bottom, and the uncured shell material 121b in the second molding of the shell layer 125a remains thereon.

Figure 14:
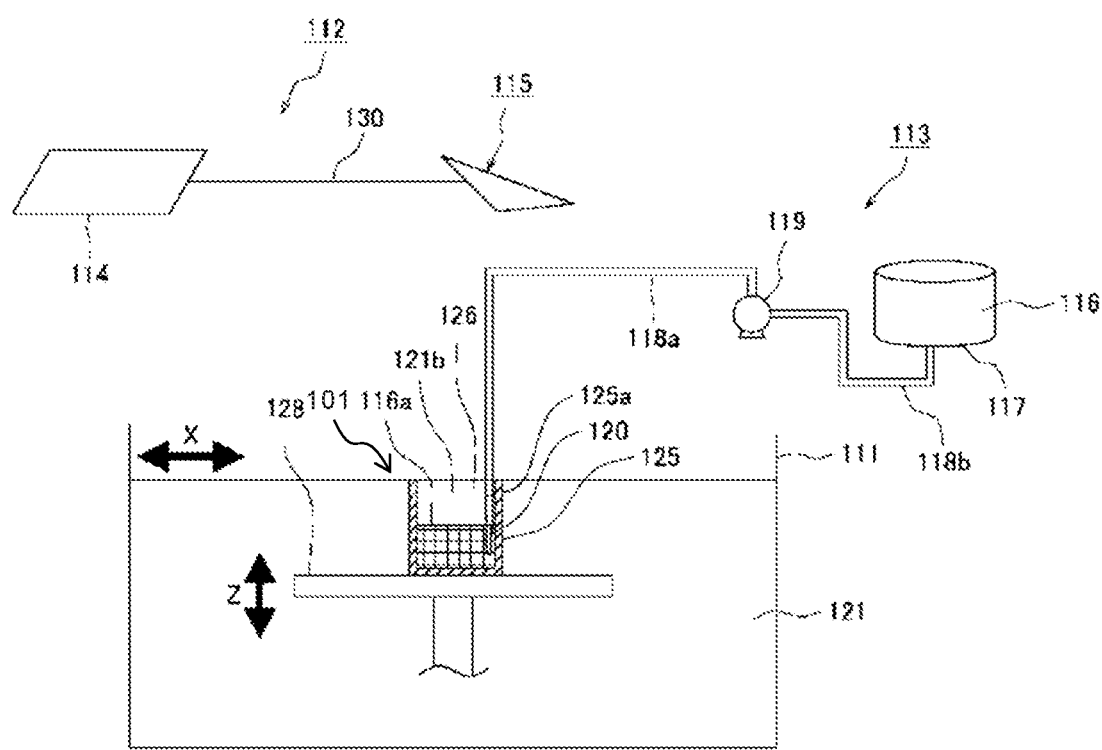
FIG. 14 is a figure showing a state during modeling by the composite material 3D printer in accordance with the present invention.
Figure 15:
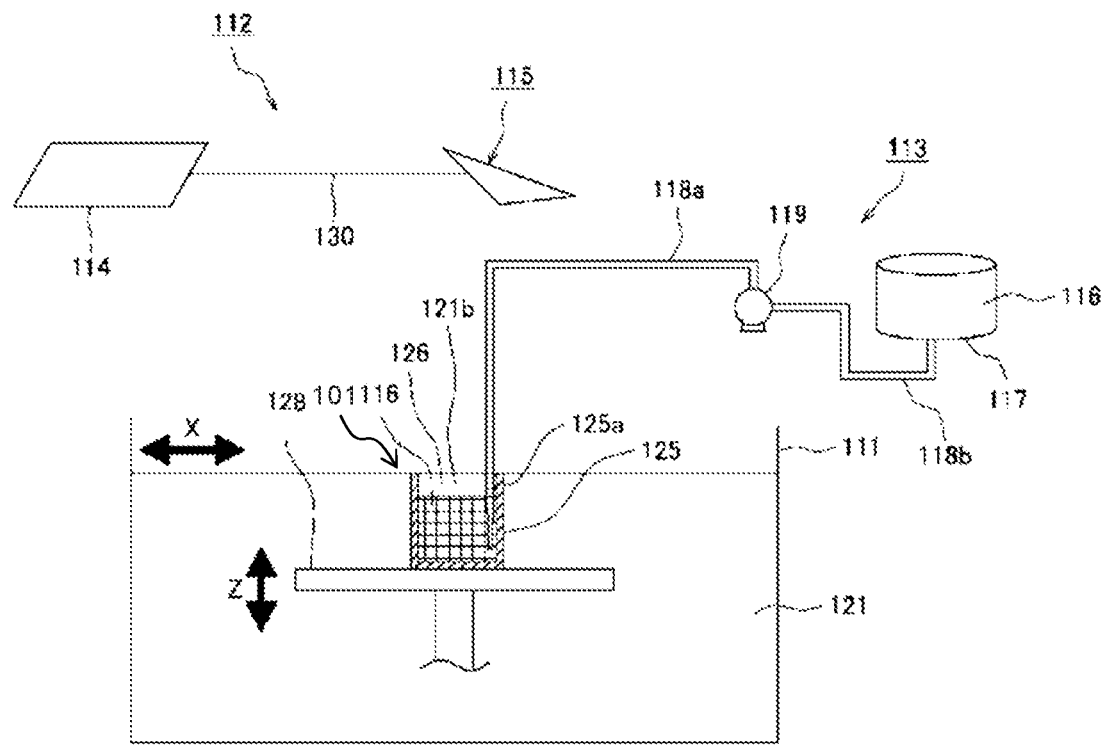
FIG. 15 is a figure showing a state during modeling by the composite material 3D printer in accordance with the present invention.
Figure 16:
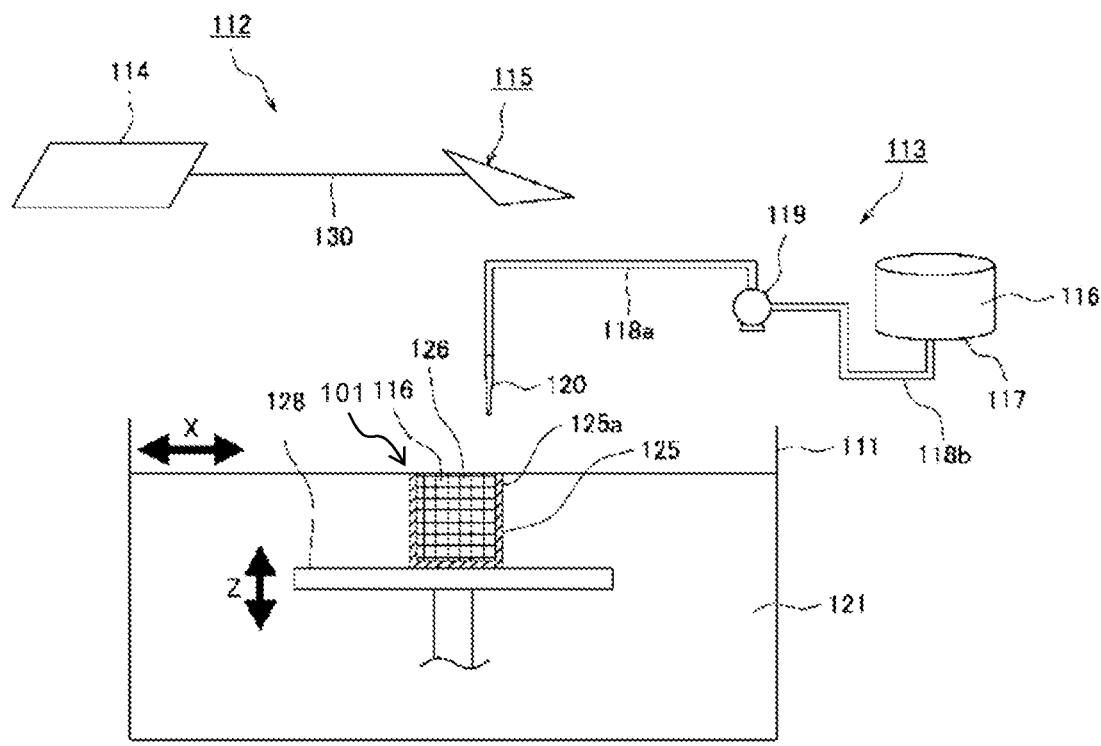
FIG. 16 is a figure showing a state during modeling by the composite material 3D printer in accordance with the present invention.
Figure 17:
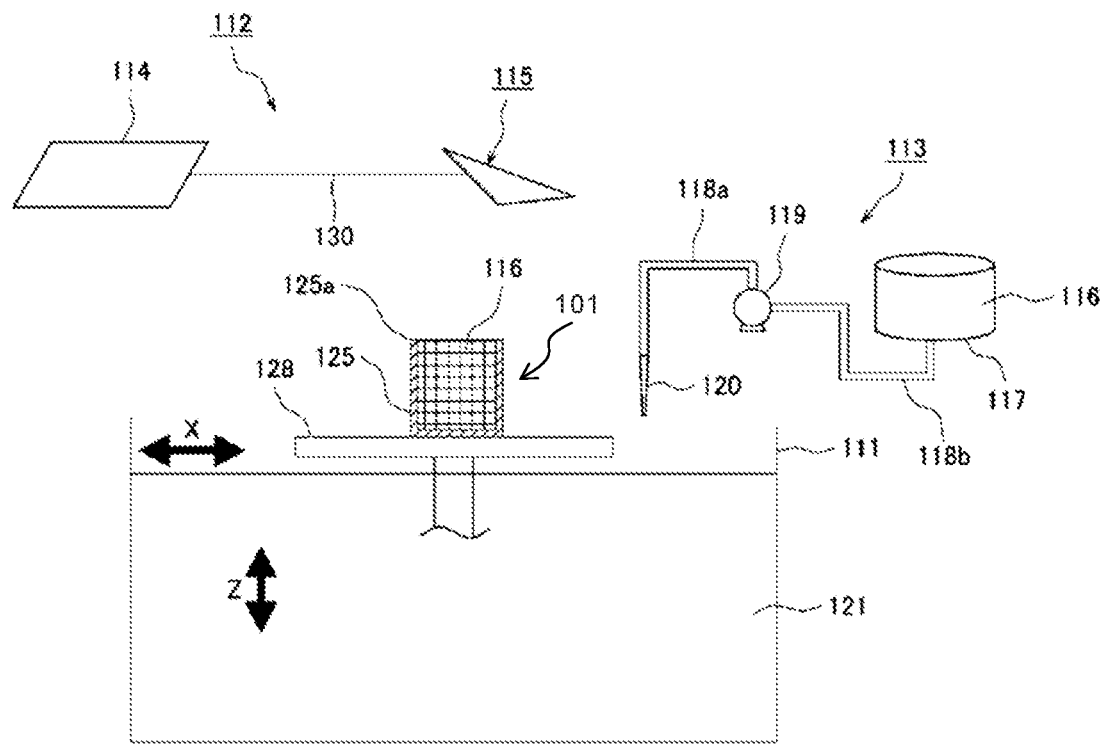
FIG. 17 is a figure showing a state during modeling by the composite material 3D printer in accordance with the present invention.

The nozzle driving mechanism is operated to position the tip of the nozzle 120 at the bottom of the core material 116a that has been injected in the first modeling (FIG. 14). In this state, the pump 119 is operated to slowly discharge and supply the core material 116 from the tip of the nozzle 120. As the core material 116 is slowly discharged and supplied as in the first modeling, the upper surface of the core material 116a that has been injected in the first modeling (interface between the injected core material 116a and the uncured shell material 121b) rises, the uncured shell material 121b overflows from the edge of the shell layer 125a, and the replacement of the uncured shell material 121b with the core material 116 proceeds (FIG. 15).

When the replacement of the uncured shell material 121b with the core material 116 is completed, the nozzle 120 is retracted (FIG. 16), the modeling table is driven such that the modeling object is exposed on the liquid surface of the ultraviolet curable resin 121 (FIG. 17), and the three-dimensional modeling object 101 is removed from the modeling table 128.

The modeling is completed by heating the removed three-dimensional modeling object 101 in a suitable heating furnace or the like to cure the core material 116 in the core portion 126.

Figure 18:
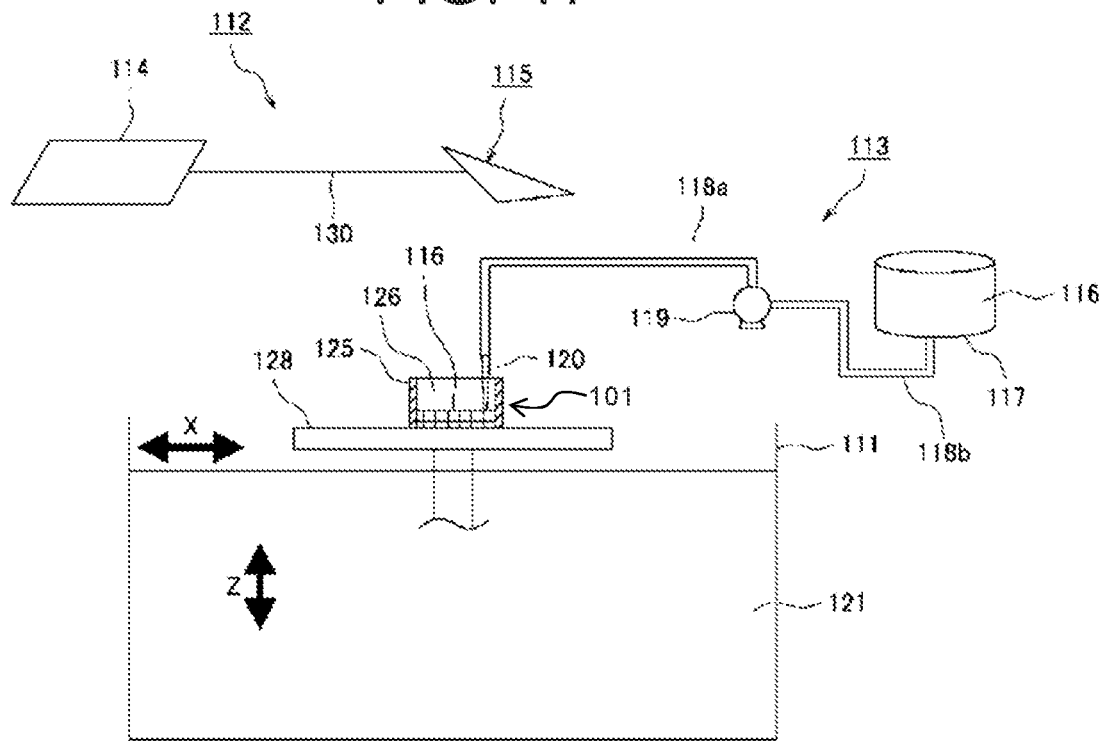
FIG. 18 is a figure showing a state during modeling by the composite material 3D printer in accordance with the present invention.

Now, with the injecting of the core material into the core portion 126, instead of injecting the core material 116 into the uncured shell materials 121a and 121b remaining in the core portion 126 as in this embodiment to replace the liquids with each other, it is also possible, in principle, to temporarily remove the uncured shell materials 121a and 121b remaining in the core portion 126 after modeling the shell layer 125 and inject the core material 116 into the core portion 126 that has become a space. In particular, when the shell layer 125 is modeled once, it is possible to inject the core material 116 into the core portion 121 after the shell layer 125 is modeled, and in a state in which the shell layer 125 is positioned on the liquid surface of the ultraviolet curable resin 121 or is further removed from the modeling table 128 and the remaining shell material 121a inside is removed (as illustrated in FIG. 18).

However, in this case, the core material 116 is injected into the core portion 126 that has become a space by removing the uncured shell material 121a, and thus there is a case in which small spaces or gaps called voids are generated because of a slight air layer remaining at the inner surface of the shell layer 125, that is, at the interface between the shell layer 125 and the injected core material. Such small spaces and gaps are extremely unfavorable from the viewpoint of strength, rigidity, fatigue characteristics, etc. of the three-dimensional modeling object.

On the other hand, it is preferable if the remaining uncured shell materials 121a and 121b and the core material 116 are replaced with each other by liquids as in this embodiment, because air is not present at the time of replacement of the two and the occurrence of such small spaces and gaps can be avoided in principle.

Furthermore, when the liquids of the uncured shell materials 121a and 121b and the like and the core material 116 are replaced with each other, the uncured shell materials 121a and 121b may slightly remain at the interface between the inner surface of the shell material 125 and the core material 116. However, this slightly remaining uncured shell materials 121a and 121b can be cured by irradiating the entire three-dimensional modeling object 101 with ultraviolet rays after completion of modeling, and will not continue to remain in an uncured state at least inside the three-dimensional modeling object 101. In general, an ultraviolet curable resin is normally transparent relative to ultraviolet rays even after curing due to its modeling characteristics, and such curing of the uncured shell materials 121a and 121b can be easily achieved.

Figure 19:
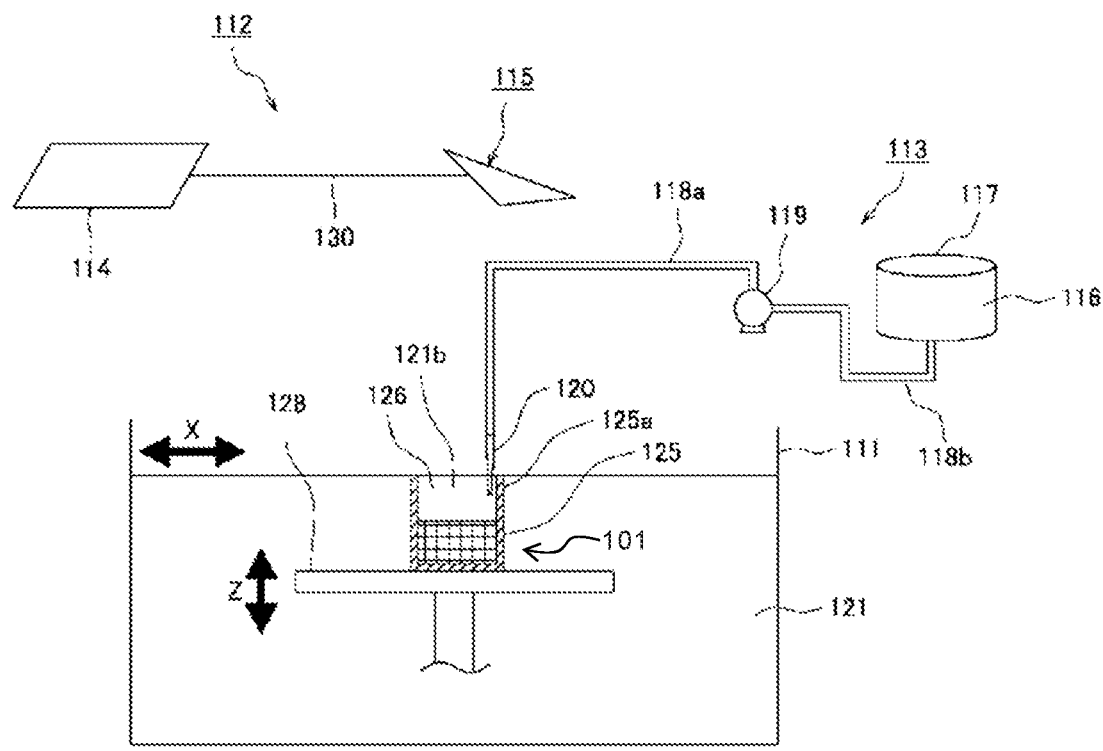
FIG. 19 is a figure showing a state during modeling by the composite material 3D printer in accordance with the present invention.
Figure 20:
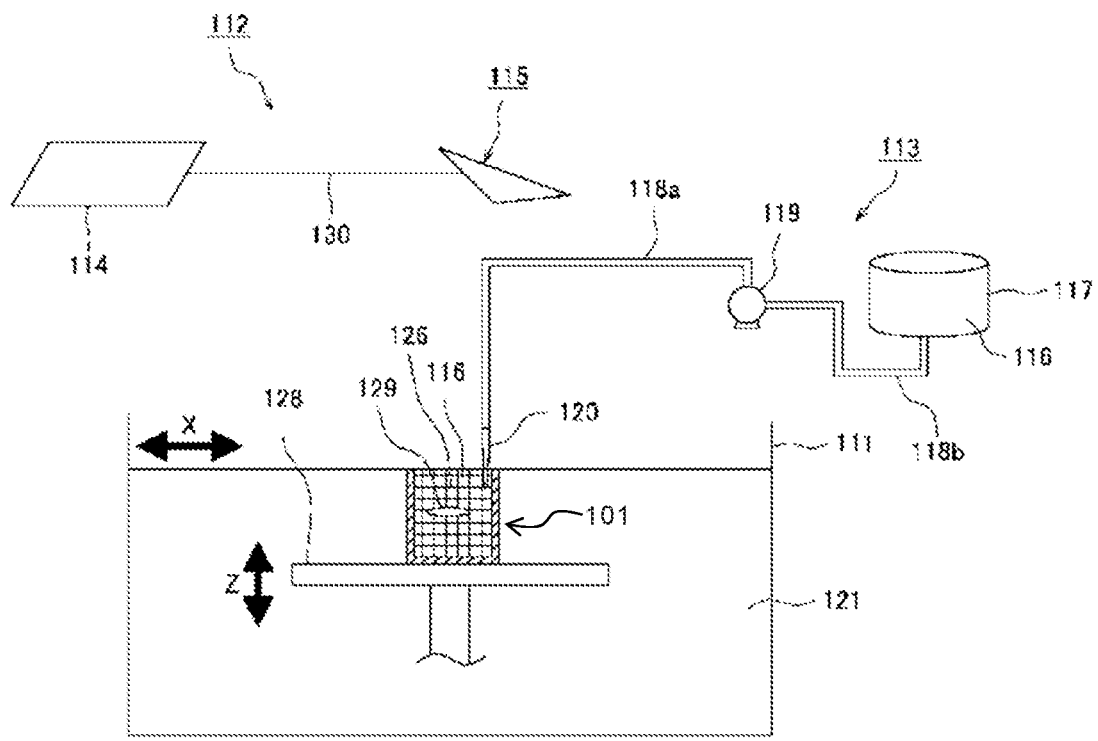
FIG. 20 is a figure showing a state during modeling by the composite material 3D printer in accordance with the present invention.
Figure 21:
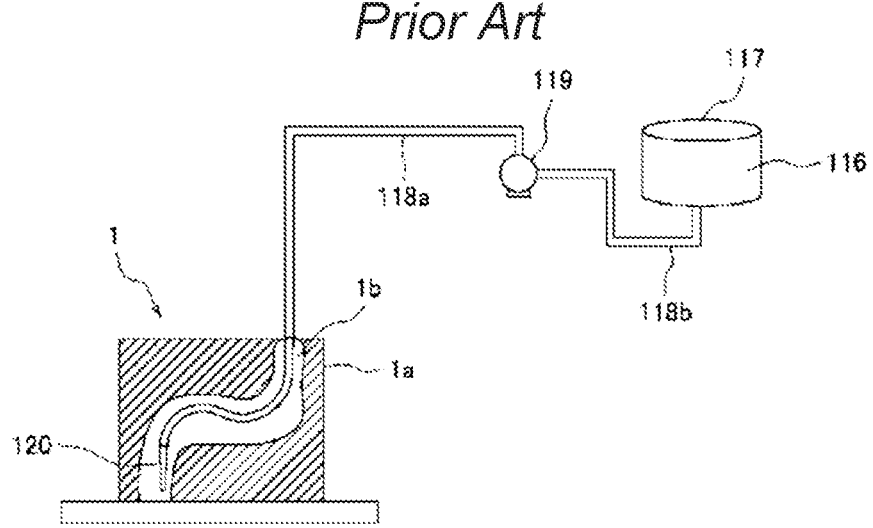
FIG. 21 is a figure showing modeling by a three-dimensional modeling apparatus in accordance with a prior art.
Figure 22A:
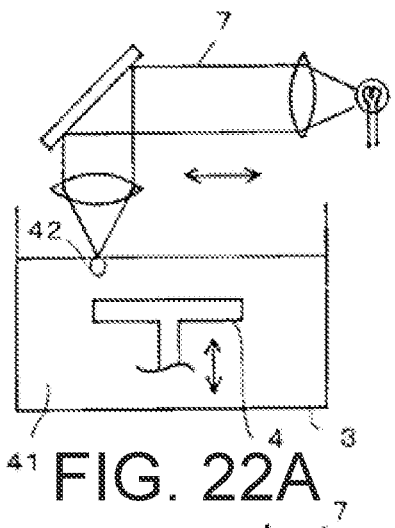
FIGS. 22A, 22B, 22C, 22D and 22E are figures showing a three-dimensional modeling apparatus by a vat polymerization.
Figure 22B:
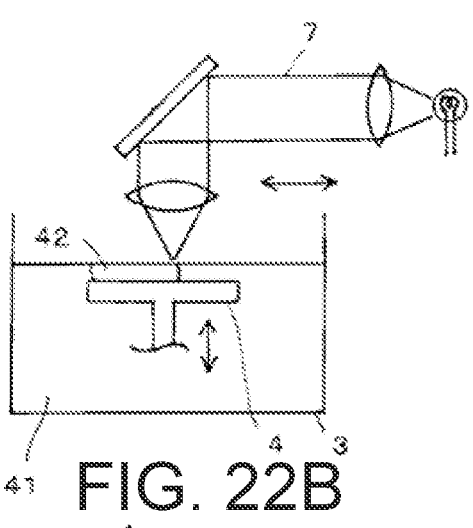
Figure 22C:
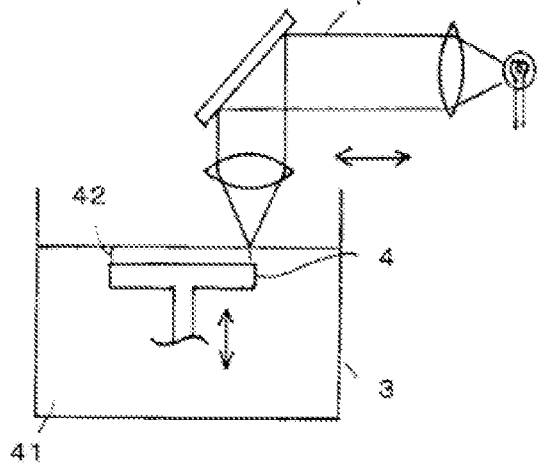
Figure 22D:
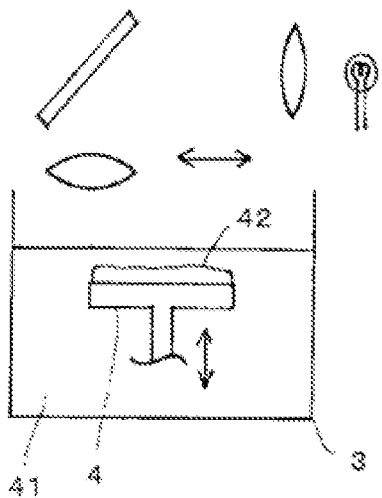
Figure 22E:
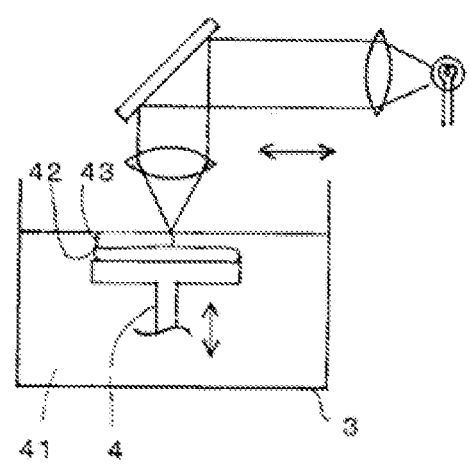
Figure 23:
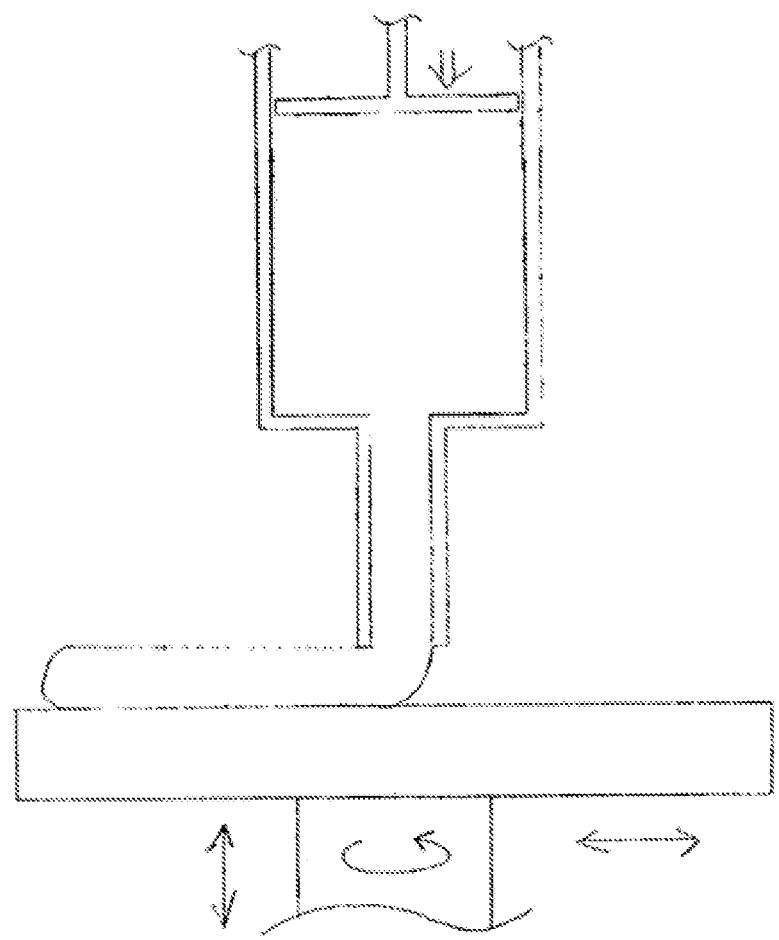
FIG. 23 is a figure showing a three-dimensional modeling apparatus by a material extrusion.
Figure 24A:
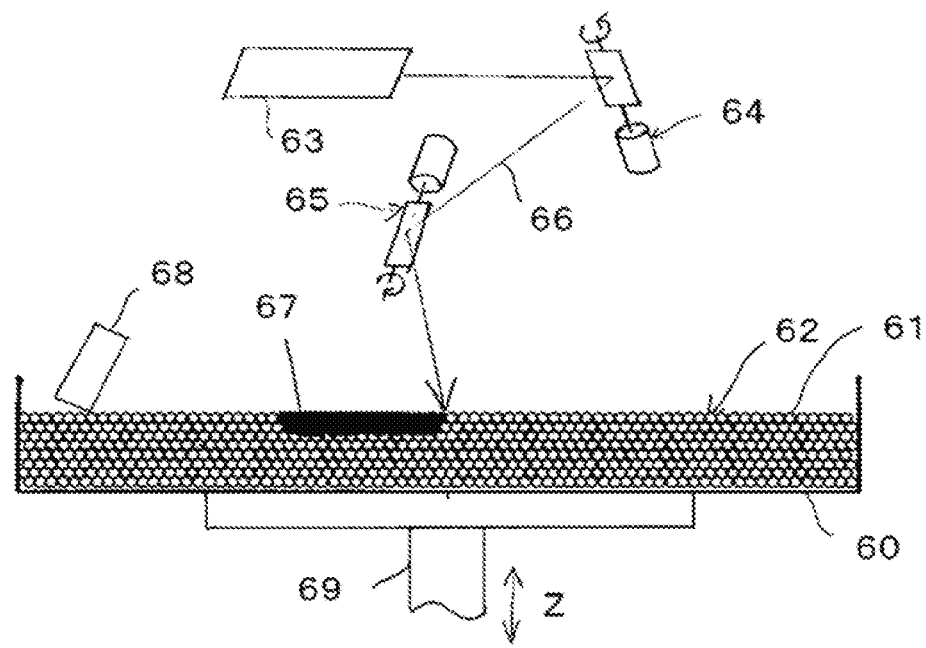
FIGS. 24A and 24B are figures showing a three-dimensional modeling apparatus by a powder bed fusion.
Figure 24B:
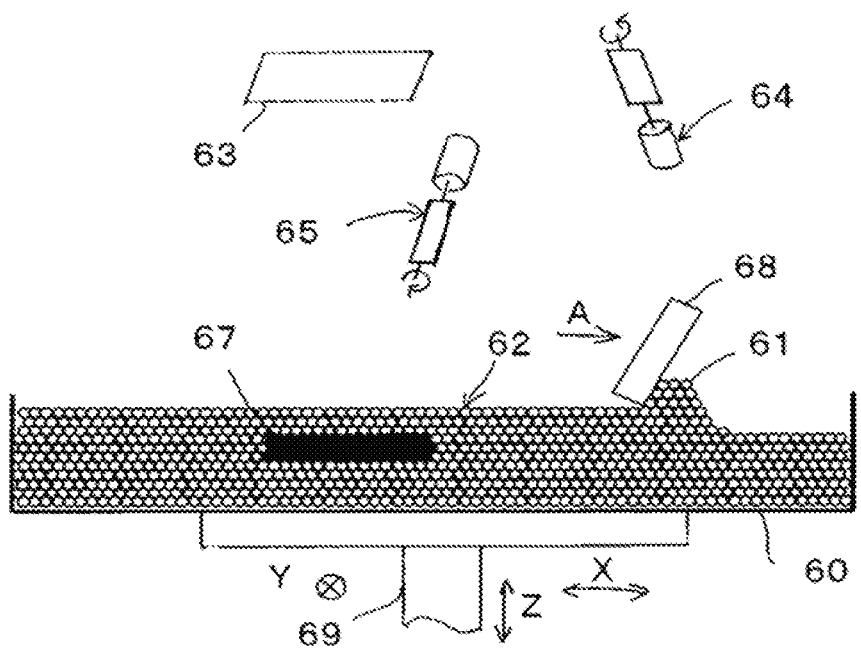
Figure 25:
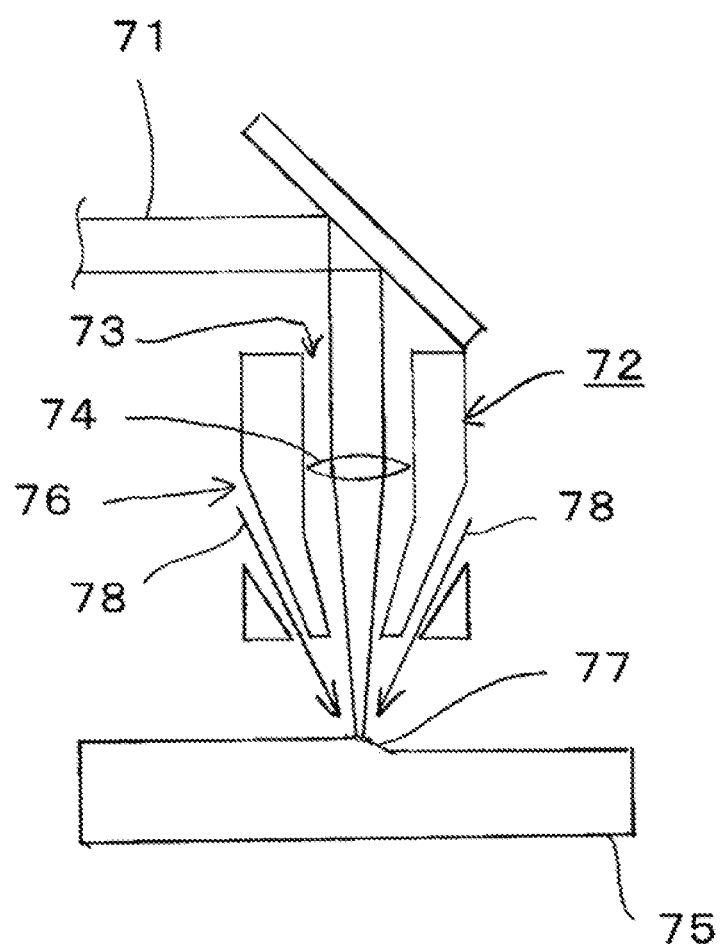
FIG. 25 is a principle diagram of a directed energy deposition.
Figure 26A:
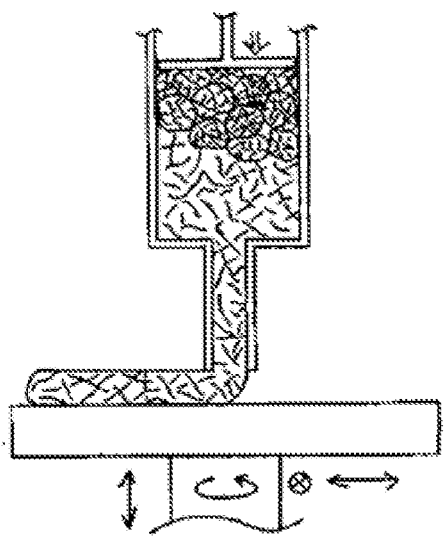
FIGS. 26A, 26B and 26C are schematic diagrams showing a state in which a composite material is applied to a 3D printer by a material extrusion in accordance with a prior art.
Figure 26B:
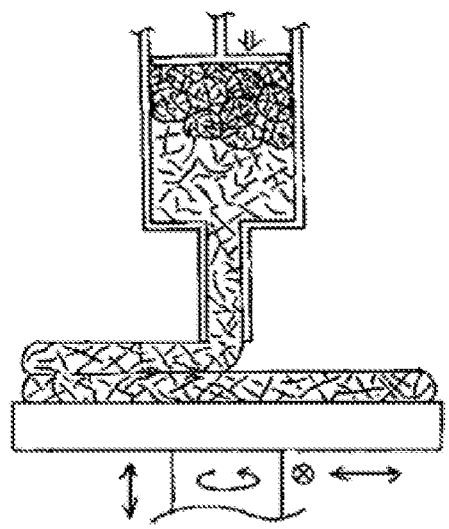
Figure 26C:
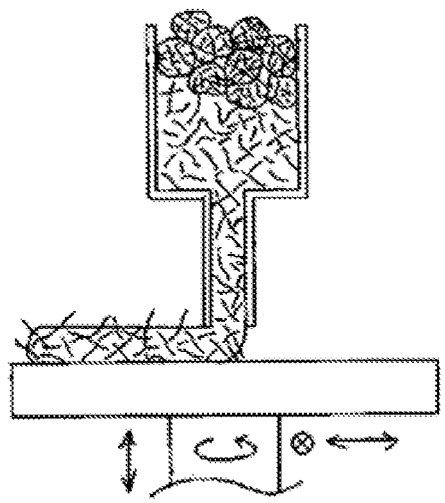
Figure 27A:
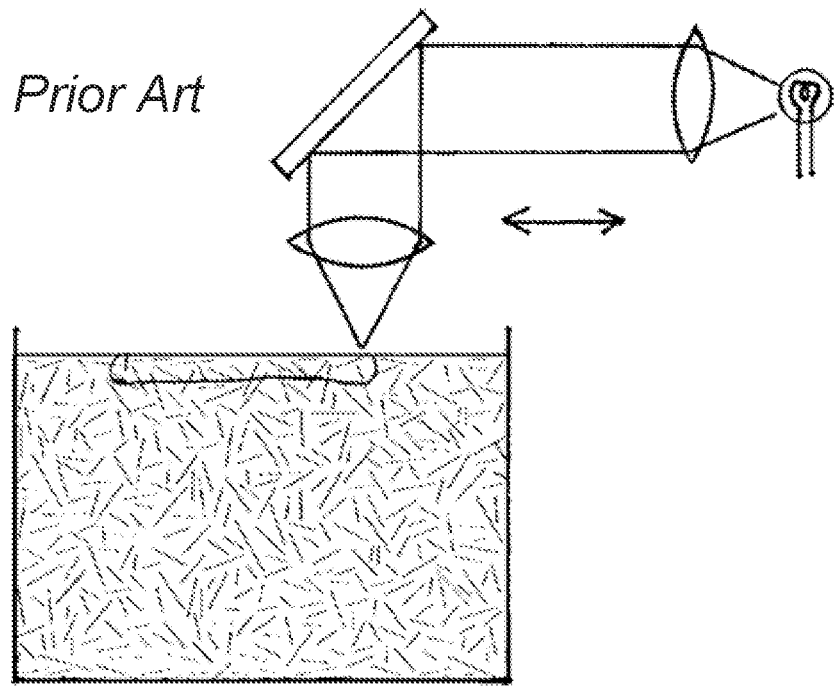
FIGS. 27A, 27B and 27C are schematic diagrams showing a state in which a composite material is applied to a three-dimensional modeling apparatus by a vat polymerization in accordance with a prior art.
Figure 27B:
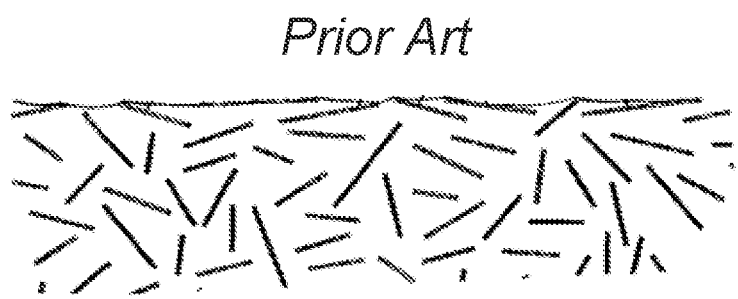
Figure 27C:
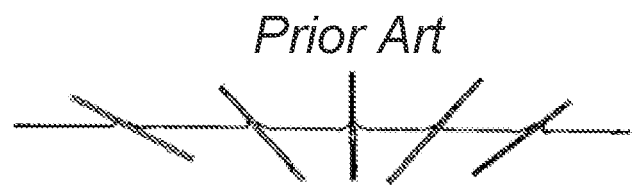

Furthermore, in the second modeling of the core portion, as shown in FIG. 19, the tip of the nozzle 120 may be in the shell material 121b remaining in the core portion 126 when the second modeling of the shell 125a is performed. When the specific gravity of the core material 116 is heavier than that of the shell material, the discharged core material 116 may settle in the shell material 121a and be newly deposited on the upper surface of the injected shell material 116a. However, in this case, as shown in FIG. 20, the shell material 121b may be slightly sandwiched and left as the interface remaining shell material 129 at the interface between the newly injected core material 116 and the already injected core material 116a, which is not preferable. This interface remaining shell material 129 remains in an uncured state even after the core material 116 is heated and cured in a subsequent modeling step, and even if it is subsequently irradiated with ultraviolet rays, since it exists in the inner part of the shell layer 125 and the core portion 116, it is difficult for ultraviolet rays to reach in many cases, and it remains uncured almost permanently, which is not preferable. In particular, when the reinforcing material in the core material 116 is carbon fiber or the like, it is extremely difficult to cure the interface remaining shell material 128 because of the UV impermeability of the carbon fiber.

The invention claimed is:

1. A three-dimensional modeling method comprising:
   modeling a shell layer of a three-dimensional modeling object using a shell material; and
   modeling a core portion inside of the shell layer using a core material, with the core material being curable from a fluid state to a non-fluid state by irradiation with an active energy ray or by application of heat energy, the modeling of the shell layer being performed by an additive manufacturing technology, and including repeatedly modeling each of multiple sections of the shell layer in a lamination modeling direction of the three-dimensional modeling object, the modeling of the core portion including repeatedly filling the core material inside of each of the multiple sections of the shell layer subsequent to each modeling of each of the multiple sections of the shell layer, and correctively curing the core material by the irradiation with the active energy ray or by the application of the heat energy after the modeling of the shell layer and the filling of the core material are all completed, the core material filled inside the shell layer maintaining a fluid state prior to the correctively curing of the core material, and the filling of the core material being performed by injecting the core material from a nozzle of a three-dimensional printer into a filled core material that has already been filled while a tip of the nozzle is being disposed in the filled core material.

2. The three-dimensional modeling method according to claim 1, wherein the shell layer is modeled by a vat polymerization, the shell material is curable from a fluid state to a non-fluid state by irradiation with an active energy ray, and an uncured part of the shell material inside of the shell layer is also cured by further irradiating with an active energy ray at the same time as or before and after the core material is collectively cured.

3. The three-dimensional modeling method according to claim 2, wherein when the core material is filled inside of the shell layer, an uncured part of the shell material and the core material are replaced with each other by injecting the core material.

4. The three-dimensional modeling method according to claim 1, wherein the shell material and/or the core material contains a reinforcing material.

5. The three-dimensional modeling method according to claim 4, wherein the reinforcing material is a fibrous reinforcing material made of carbon fiber, glass fiber, aramid fiber, or a combination thereof.

6. The three-dimensional modeling method according to claim 2, wherein the lamination modeling direction is a gravitational direction, and a specific gravity of an uncured core material is larger than a specific gravity of an uncured shell material.

7. The three-dimensional modeling method according to claim 2, wherein the shell material and/or the core material contains a reinforcing material.

8. The three-dimensional modeling method according to claim 3, wherein the shell material and/or the core material contains a reinforcing material.

9. The three-dimensional modeling method according to claim 7, wherein the reinforcing material is a fibrous reinforcing material made of carbon fiber, glass fiber, aramid fiber, or a combination thereof.

10. The three-dimensional modeling method according to claim 8, wherein the reinforcing material is a fibrous reinforcing material made of carbon fiber, glass fiber, aramid fiber, or a combination thereof.

11. The three-dimensional modeling method according to claim 3, wherein the lamination modeling direction is a gravitational direction, and a specific gravity of an uncured core material is larger than a specific gravity of the uncured shell material.

12. The three-dimensional modeling method according to claim 1, wherein the lamination modeling direction is a gravitational direction, and a specific gravity of an uncured core material is larger than a specific gravity of the uncured shell material.

13. The three-dimensional modeling method according to claim 4, wherein the lamination modeling direction is a gravitational direction, and a specific gravity of an uncured core material is larger than a specific gravity of an uncured shell material.

14. The three-dimensional modeling method according to claim 5, wherein the lamination modeling direction is a gravitational direction, and a specific gravity of an uncured core material is larger than a specific gravity of an uncured shell material.

* * * * *